(12) United States Patent
Uchida et al.

(10) Patent No.: US 7,065,024 B2
(45) Date of Patent: Jun. 20, 2006

(54) DISK DRIVE UNIT

(75) Inventors: Morihiko Uchida, Tokyo (JP); Tetsuya Suzuki, Tokyo (JP); Yoshikazu Kagawa, Tokyo (JP); Hiroto Handa, Tokyo (JP)

(73) Assignee: Clarion Co., Ltd., Tokyo (JP)

( * ) Notice: Subject to any disclaimer, the term of this patent is extended or adjusted under 35 U.S.C. 154(b) by 99 days.

(21) Appl. No.: 10/311,501

(22) PCT Filed: Jun. 15, 2001

(86) PCT No.: PCT/JP01/05136

§ 371 (c)(1),
(2), (4) Date: Jun. 9, 2003

(87) PCT Pub. No.: WO01/97002

PCT Pub. Date: Dec. 20, 2001

(65) Prior Publication Data

US 2004/0037174 A1 Feb. 26, 2004

(30) Foreign Application Priority Data

Jun. 16, 2000 (JP) ............................... 2000-180939

(51) Int. Cl.
*G11B 7/85* (2006.01)
(52) U.S. Cl. .................................. 369/53.25; 711/164
(58) Field of Classification Search ................... None
See application file for complete search history.

(56) References Cited

OTHER PUBLICATIONS

Schaeler, Bruce, "Applied Cryptography, second edition: Protocols, Algorithms, and Source Code in C", John Wiley & Sons, Inc., US, 1996, pp. 180-181.

*Primary Examiner*—Andrea Wellington
*Assistant Examiner*—Lixi Chow

(57) ABSTRACT

There are provided: an optical pickup feed mechanism (12) that detects a disk signal; a disk loading mechanism (11) that feeds a disk D by means of a loading roller (11b) that is driven by a loading motor (11a); a mechanism control section (20) that controls drive of the loading motor (11a); and an authentication control section (30) that authenticates the authorized user and outputs a disk ejection instruction to the mechanism control section (20) if the registered password and disk ejection instruction are input.

22 Claims, 6 Drawing Sheets

DISK DRIVE UNIT

TECHNICAL FIELD

The present invention relates to a disk drive device for detecting information recorded on a disk and in particular relates to a disk drive device wherein improvement is effected in the control of the disk ejection mechanism.

BACKGROUND ART

Typically, personal computers are provided with disk drive devices for removable media such as CD-ROMs, DVD-ROMs or MO disks. Such disk drive devices are often, for example as shown in FIG. 7, of the tray type in which a disk D is inserted/ejected by placing the disk D on a tray T that can be extended from or retracted into the main unit C of a personal computer.

Ejection of the disk D in a disk drive device of this tray of type is performed by causing the tray T to project from the main unit C by operating a mechanism that drives the tray T by manually operating an eject button E provided on the tray T. It was also possible to eject the disk D by driving the tray T by inputting a disk ejection instruction, using the OS (operating system) of the personal computer.

However, in such a disk drive device as described above, anyone at all could easily remove the disk by performing operation of the eject button or input of a disk ejection instruction. Consequently for example persons other than the authorized user of the personal computer could easily remove the disk, increasing the possibility of the disk being stolen.

Also, with a disk tray device of the tray type as described above, it was possible to remove the disk mounted on the tray by forcibly pulling out the tray, so there was a possibility of the disk being carried off even without performing a proper disk ejection operation.

In view of the above problems of the prior art, an object of the present invention is to provide a disk drive device wherein removal of the disk by persons other than the authorized user can be positively prevented.

DISCLOSURE OF THE INVENTION

In order to achieve the above object, the present invention, in a disk drive device comprising a signal detection section that detects a disk signal and a disk ejection mechanism that ejects a disk, comprises the following technical features.

Specifically, according to the present invention, the disk ejection mechanism comprises a loading roller arranged to be capable of feeding a disk by rotation and a motor constituting a drive power source of said loading roller; and it is characterized in that it comprises: mechanism control means that controls drive of said motor; and authentication control means that outputs a disk ejection instruction to said mechanism control means if a disk ejection instruction and authentication information are input.

With the present invention as described above, a disk ejection instruction is output to the mechanism control means from the authentication control means by the authorized user inputting a disk ejection instruction and the authentication information, and the mechanism control means thereby drives the motor, causing the disk to be ejected by rotation of the loading roller. In contrast, in the case of an unauthorized user, even if this user inputs a disk ejection instruction and authentication information i.e. wrong authentication information, the mechanism control means cannot output the disk ejection instruction and the mechanism control means cannot drive the motor, so the disk is not ejected. Also, since disk ejection is performed by a loading roller, it is not possible to pull the disk out forcibly, as it is in the case of the tray type. It is therefore possible to reliably prevent persons other than the authorized user from carrying off the disk.

In a further embodiment of the device, authentication information input means that inputs authentication information is connected to said authentication information control means and said authentication control means comprises: an authentication information storage section that stores prescribed authentication information; a decision section that decides whether or not the authentication information that is input from said authentication information input means and the authentication information stored in said authentication information storage section are in agreement; and a disk ejection instruction section that outputs a disk ejection instruction to said mechanism control means if a disk ejection instruction is input and the authentication information is determined to be in agreement by said decision section.

With a device according to the above embodiment, the disk ejection instruction can only be output to the mechanism control means if authentication information is input and the decision section determines that this agrees with the prescribed authentication information. The authorized user can therefore prevent other persons from carrying off the disk by managing the authentication information.

Also, in another embodiment, said authentication information is disk-specific information.

In a device according to this embodiment, disk-specific information such as for example the file name recorded in the disk, the holder name, the TOC (table of contents) information, playing time, or title etc is used as the authentication information, so the authorized user can easily remember the authentication information.

Also, in a device according to another embodiment, the authentication information is a password.

In a device according to this embodiment, theft prevention can be achieved by a password that can easily be managed by the authorized user.

Also, in a device according to another embodiment, said authentication information input means comprises a plurality of switches operated by a plurality of buttons and said authentication information is information relating to a combination of sequence and number of times of switch changeover in accordance with operation of said plurality of buttons.

In a device according to this embodiment, input of authentication information can easily be performed by a combination of button operations.

Also, in a device according to another embodiment, said authentication information input means comprises a voice identification section and said authentication information is speaker-limiting voice information.

In a device according to this embodiment, authentication of the authorized user is performed by voice, so confirmation of the authorized user can be achieved more accurately.

Also, in a device according to another embodiment, said authentication information input means comprises a fingerprint identification section and said authentication information is fingerprint information.

In a device according to this embodiment, authentication of the authorized user can be performed by a fingerprint, so confirmation of the authorized user can be achieved more accurately.

Also, in a device according to another embodiment, said authentication information input means comprises a retinal pattern detection section and said authentication information is retinal pattern information.

In a device according to this embodiment, authentication of the authorized user can be performed by means of a retinal pattern, so confirmation of the authorized user can be achieved more accurately.

Also, in a device according to another embodiment, the authentication information used in the determination by said decision section is at least two of a plurality of types of authentication information or is one or other of at least two types of the plurality of types of authentication information.

In a device according to this embodiment, authentication of the authorized user can be performed by a combination of authentication information of a plurality of types, so a person other than the authorized user can be more reliably prevented from carrying off the disk.

BEST MODE FOR CARRYING OUT THE INVENTION

[1. Construction of an Embodiment]

An embodiment of the present invention is described below with reference to FIG. 1 to 6. The portions related to information processing of the authentication control section and mechanism control section in this embodiment are typically performed by a CPU (which may be a CPU of the main computer unit, or a CPU dedicated to the disk drive device or a CPU of an external processing device) controlled by software and its peripheral circuitry. The software achieves the beneficial effect of the present invention by physically utilizing the hardware but, since the type and/or construction of the software or hardware and range of processing with the software etc can be altered in many different ways, in the following description, virtual circuit blocks are employed for implementing the functions of the present invention and the embodiment. The present invention can also be embodied as a recording medium on which software for implementing this by a computer is recorded.

Figure 1:
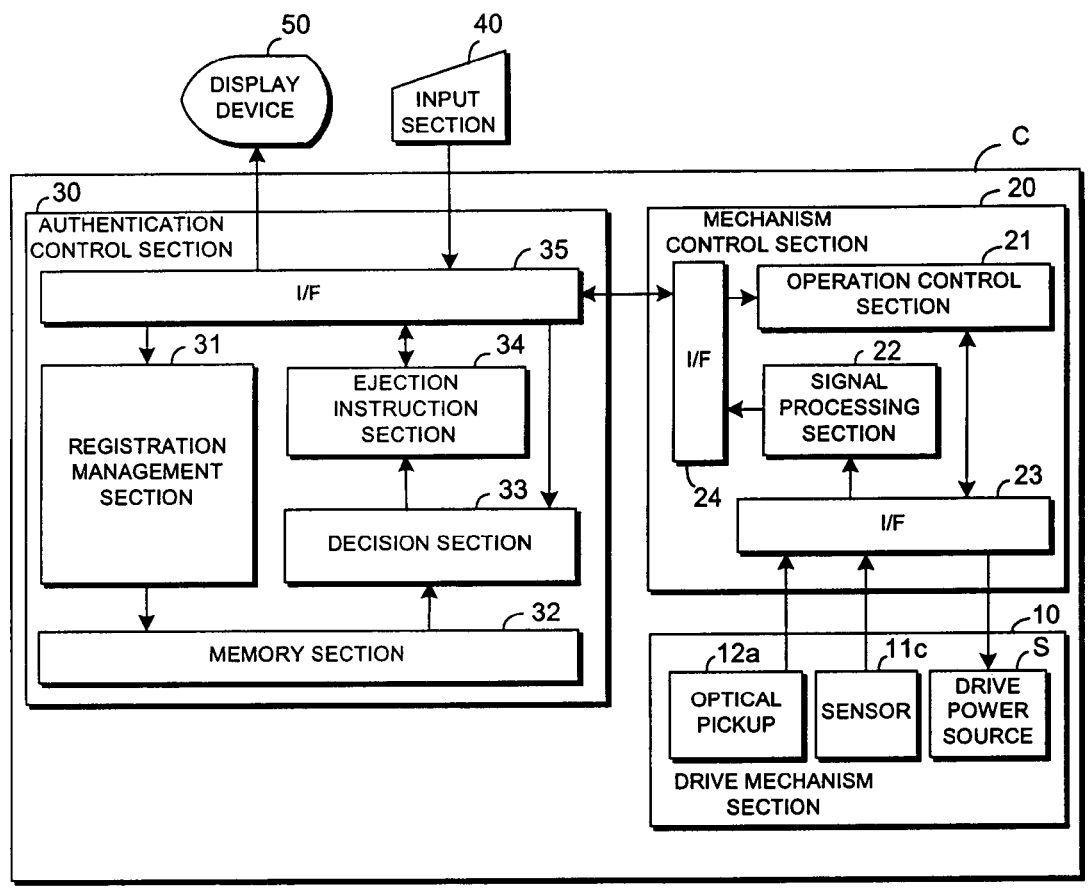
FIG. 1 is a functional block diagram illustrating an embodiment of a disk drive device according to the present invention.
Figure 2:
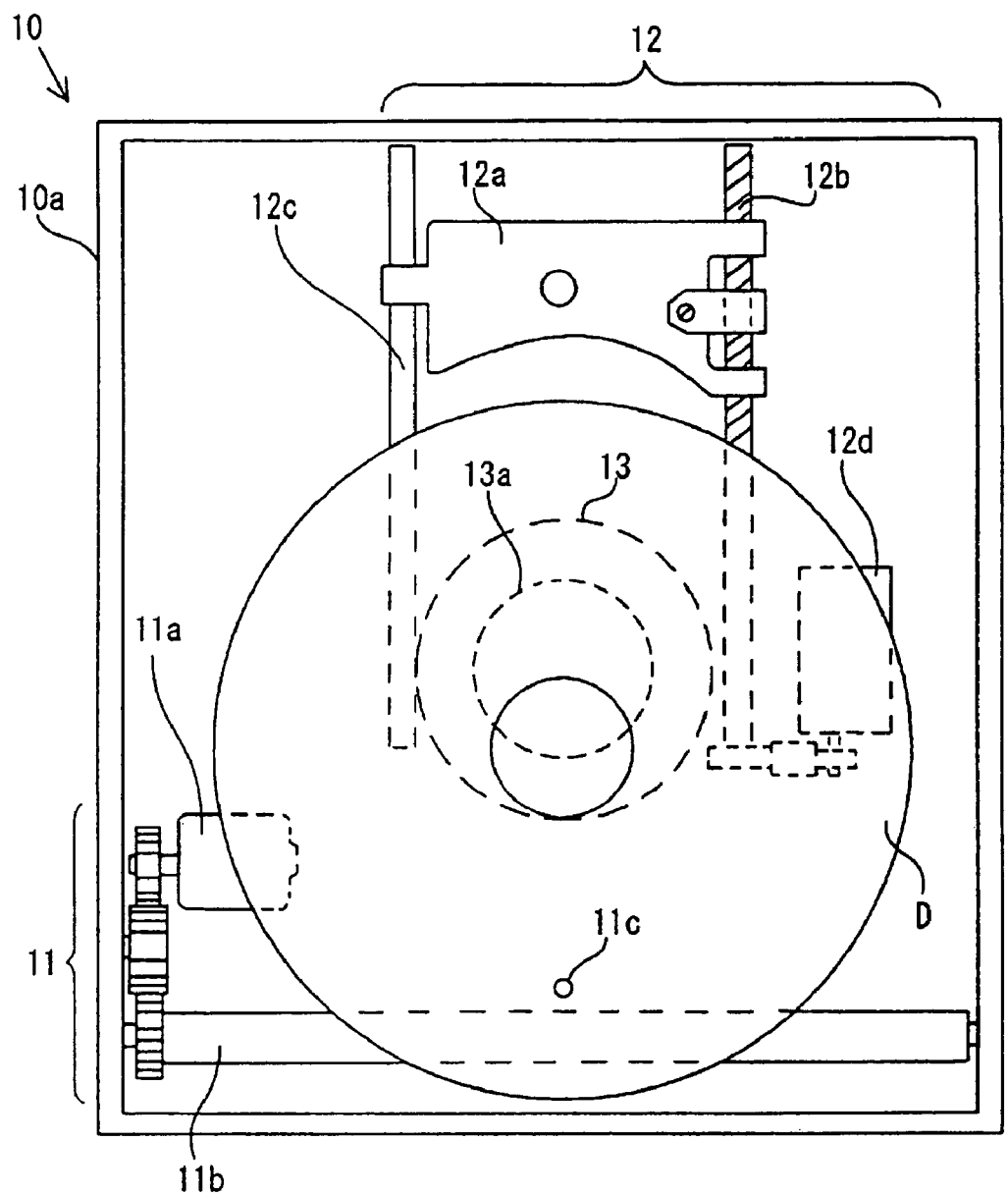
FIG. 2 is a plan view showing a drive mechanism section in the embodiment of FIG. 1.
Figure 3:
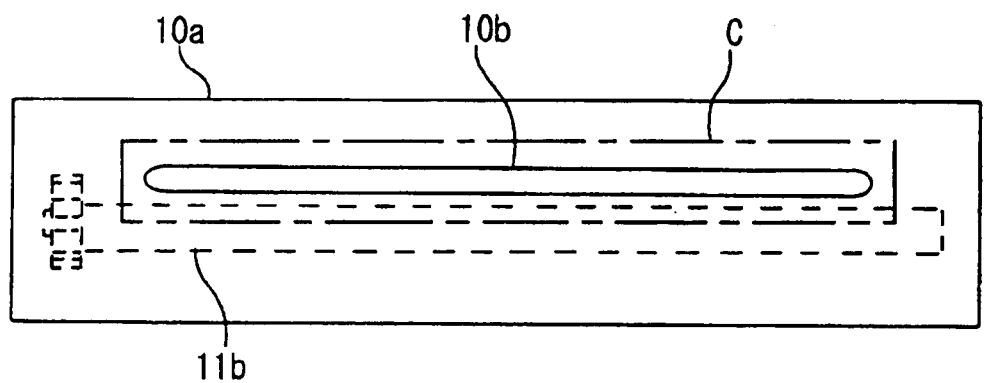
FIG. 3 is a front view showing the drive mechanism section in the embodiment of FIG. 1.
Figure 4:
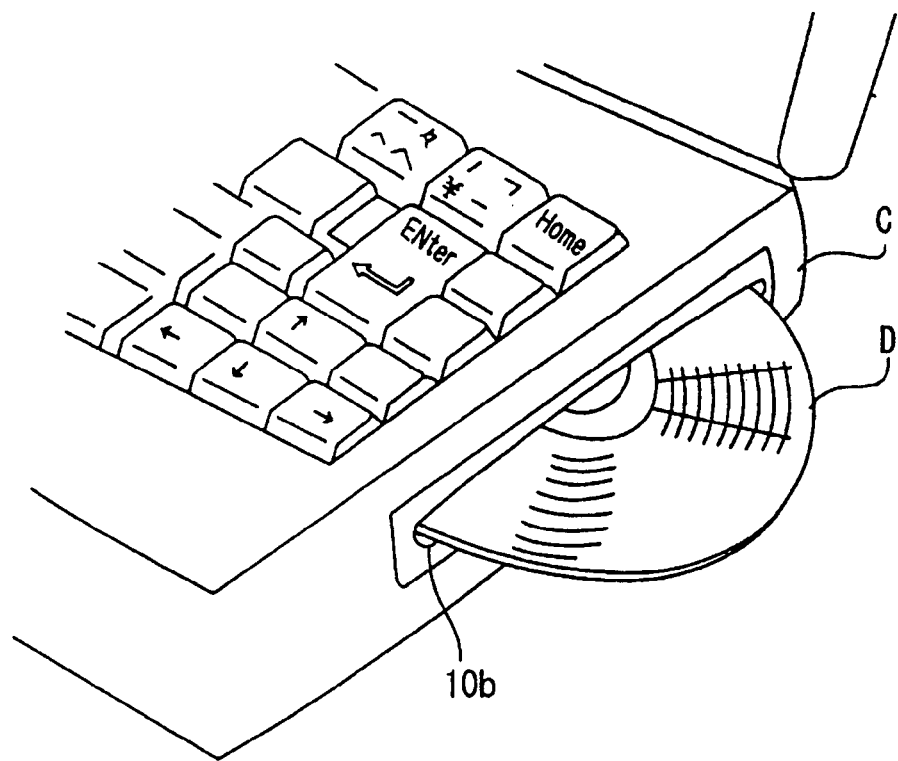
FIG. 4 is a perspective view showing a disk insertion aperture of a main computer unit in the embodiment of FIG. 1.
Figure 5:
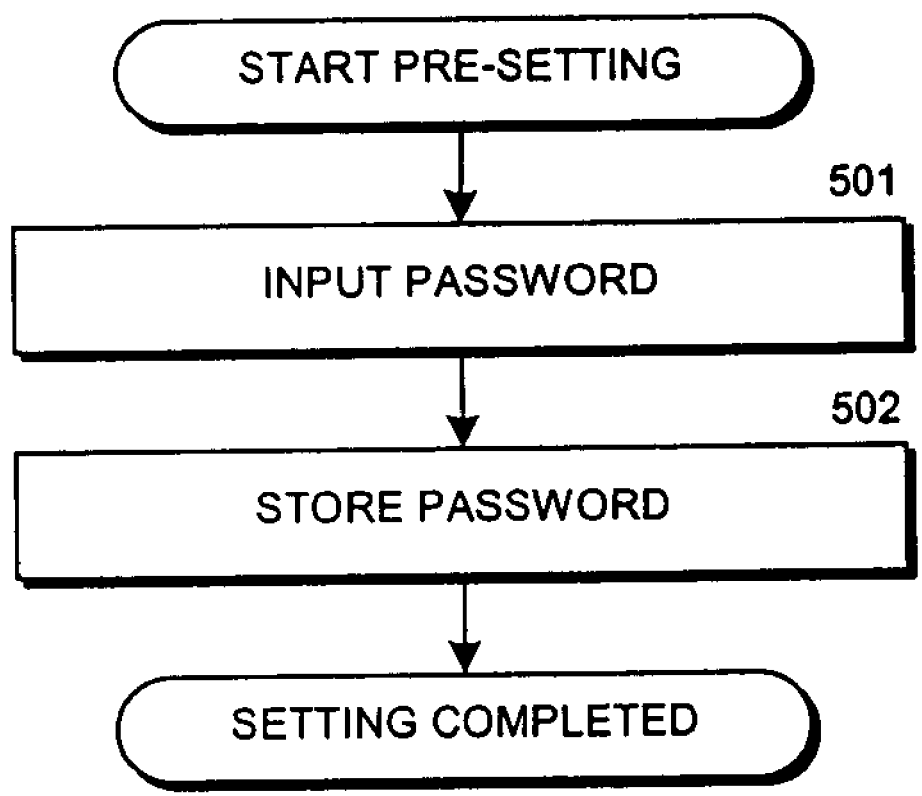
FIG. 5 is a flow chart showing the sequence of registration processing in the embodiment of FIG. 1.
Figure 6:
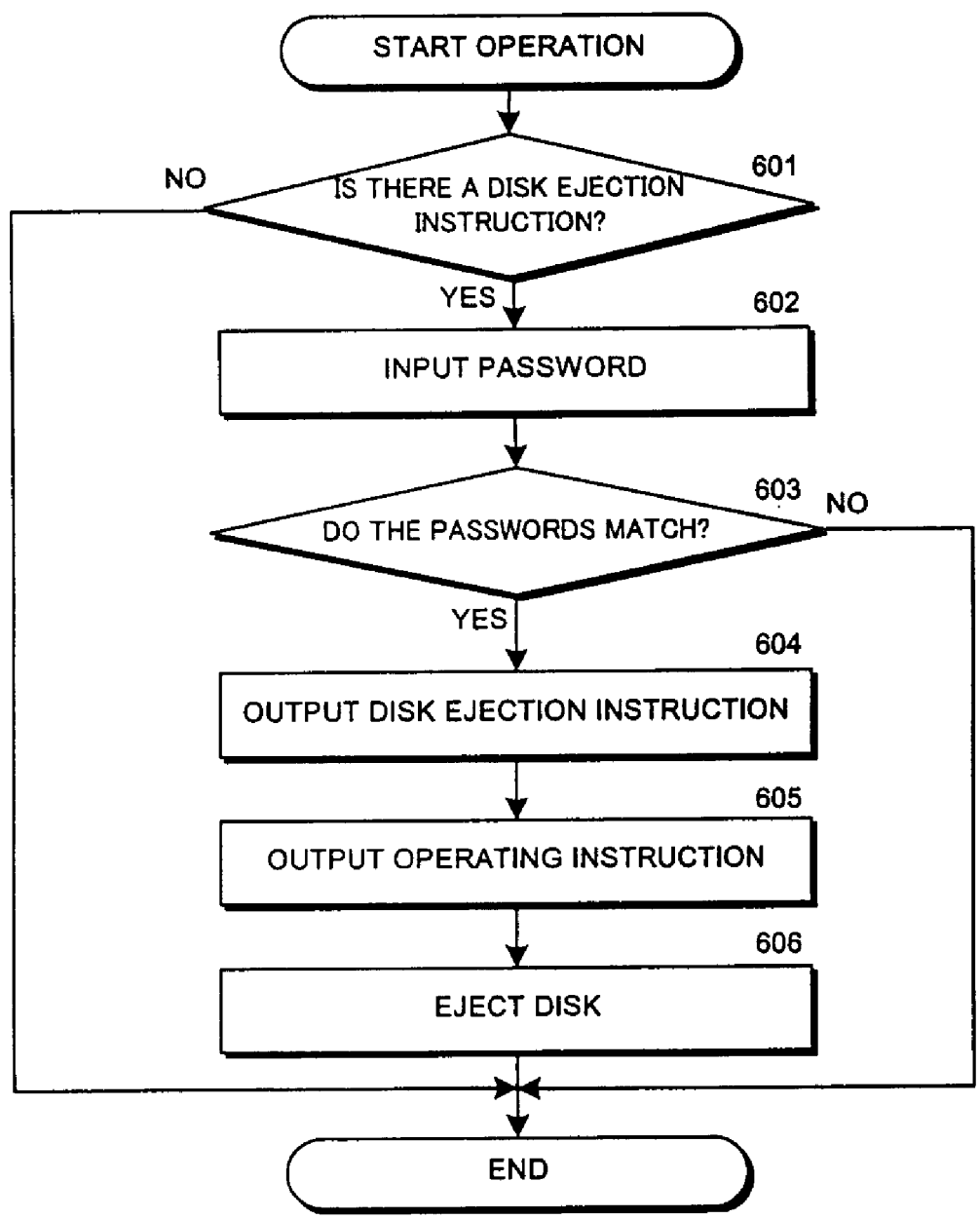
FIG. 6 is a flow chart showing the sequence of authentication processing in the embodiment of FIG. 1.
Figure 7:
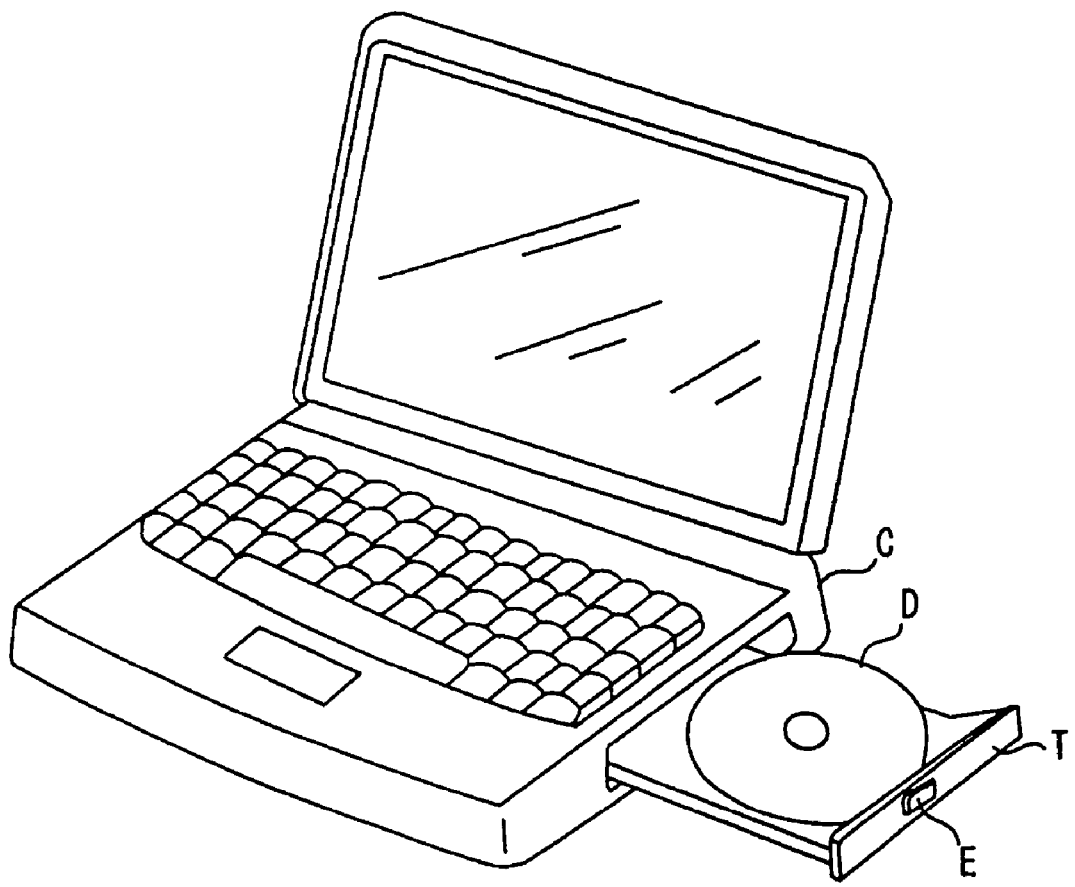
FIG. 7 is a perspective view showing an example of a personal computer incorporating a disk drive device of the tray type.

Specifically, as shown in FIG. 1, this embodiment comprises a drive mechanism section 10 constituted within the main computer unit C, a mechanism control section 20 and authentication control section 30, an input section 40 such as a keyboard or a mouse connected to the computer and a display device 50 such as a CRT or LCD. As shown in FIG. 2, the drive mechanism section 10 comprises a disk loading mechanism 11 arranged in a frame 10a, an optical pickup feed mechanism 12, a turntable 13 and a clamping mechanism, not shown, etc. An insertion aperture 10b for a disk D is formed in the frame 10a as shown in FIG. 3. Also, as shown in FIG. 3 and FIG. 4, the frame 10a is accommodated in the main computer unit C in such a way that it cannot be pulled out, only the insertion aperture 10b being exposed.

The disk loading mechanism 11 comprises a loading roller 11b that is rotated by a loading motor 11a with the aid of a gear mechanism and a disk guide (not shown) whereby the disk D is gripped between this and the loading roller 11b. The loading roller 11b is arranged such that it is capable of being moved in a direction such as to approach or to move away from the disk D by means of a roller approach/retraction mechanism, not shown. A sensor 11c that detects insertion/ejection of a disk D is provided in the vicinity of the insertion aperture 10b inside the frame 10a.

In the optical pickup feed mechanism 12, an optical pickup 12a for disk signal detection is slidably arranged between a lead screw 12b in the surface of which a screwthread is cut and a guide shaft 12c arranged parallel therewith. The lead screw 12b is arranged to be capable of rotation by means of a feed motor 12d by means of a gear mechanism and the optical pickup 12a can be slid in the direction of the diameter of the disk D by means of this rotation. The optical pickup 12a comprises an actuator for performing tracking and focusing.

The turntable 13 is the member on which the disk D is placed during signal detection and is arranged to be capable of rotation by means of a spindle motor 13a. The clamping mechanism is a mechanism for gripping the internal diameter of the disk D between a clamper, not shown and the turntable 13.

The mechanism control section 20 comprises a loading motor 11a in the drive mechanism section 10, a feed motor 12d, a spindle motor 13a, the actuator of the optical pickup, an operation control section 21 that controls the various drive power sources (S of FIG. 1) such as the motor of the roller approach/retraction mechanism, a signal processing section 22 that processes the signal detected by the optical pickup 12a and interfaces (I/F) 23, 24 between the drive mechanism section 10 and the authentication control section 30.

The authentication control section 30 comprises a registration management section 31 that manages authentication information that is registered beforehand, a memory section 32 that stores authentication information, a decision section 33 that compares the authentication information stored in the memory section 32 with input authentication information and decides whether or not these agree, an ejection instruction section 34 that outputs a disk ejection instruction to the mechanism control section 20 if a disk ejection instruction is input from the input section 40 and the decision section 33 decides that the authentication information is in agreement, a mechanism control section 20, and an interface (I/F) 35 between the input section 40 and a display device 50. It should be noted that, in FIG. 1, depiction of the various calculation devices and storage devices etc to be provided in the main computer unit C is omitted.

[2. Operation of the Embodiment]

[2-1. Disk Insertion]

The operation of the above embodiment will now be described. Specifically, when the authorized user inserts a disk D from the insertion aperture 10b, the disk insertion is detected by the sensor 11c. The loading motor 11a is then operated by an instruction from the operating control section 21 so that rotation of the loading roller 11b in the disk insertion direction is commenced. The disk D is thereby drawn in towards the turntable 13 whilst being gripped between the loading roller 11b and the disk guide. When the internal diameter of the disk D coincides with the turntable 13, the loading roller 11b descends and thereafter the disk D is gripped by the clamping mechanism between the clamper and the turntable 13.

Concurrently with the disk D being set on the turntable 13 in this way, the loading roller 11b is moved in the direction away from the disk D by the roller approach/retraction mechanism, releasing the disk D. Then, while the disk D is rotated on the turntable 13 by the operation of the spindle motor 13a, the optical pickup is moved in the direction of the diameter of the disk D by operation of the feed motor 12d and the actuator, and the signal recorded on the disk is detected. The detected signal is processed by the signal processing section 22 and output to the CPU of the computer.

[2-2. Prevention of Theft Using a Password]

Removal of the disk D that has been accommodated in the drive mechanism section 10 as described above by a person other than the authorized user is prevented by the sequence illustrated below. This sequence is described with reference to the flow chart of FIGS. 5 and 6. In this embodiment, an input screen display such as a dialogue box is arranged to be displayed on the display device 50 for input of a password.

First of all, in response to instructions on the input screen, an authorized user who wishes to set disk theft prevention inputs a password, which may be selected at will, from the input section 40 (step 501). This password is then stored (step 502) in the memory section 32 as the password of the authorized user by the registration management section 31 in the authentication control section 30 and pre-setting processing is thereby terminated. Then, when the authorized user wishes to remove the disk D, he inputs (step 601) a disk ejection instruction from the input section 40. When this happens, the display device 50 displays the password input screen, so the user inputs the registered password as described above from the input section 40 (step 602).

The decision section 33 compares the input password with the authorized user's password stored in the memory section 32 and determines whether or not these are in agreement (step 603). If it is determined that these are in agreement, the ejection instruction section 34 outputs a disk ejection instruction (step 604) to the operating control section 21 of the mechanism control section 20.

When the disk ejection instruction from the ejection instruction section 34 has thus been input to the operating control section 21, the operating control section 21 releases the disk from the clamping mechanism, outputs an operating instruction to the loading motor 11a and outputs an instruction to the roller approach/retraction mechanism to move the loading roller 11b in the direction such as to approach the disk D (step 605), so the disk D is ejected from the insertion aperture 10b (step 606) while being gripped between the disk guide and the loading roller 11b which is rotating in the disk ejection direction. When completion of ejection of the disk D is detected by the sensor 11c, the operation control section 21 stops the loading motor 11a.

On the other hand, if a person who is not the authorized user inputs a disk ejection instruction (step 601), and a password which is not that which was registered beforehand is input (step 602) in response to the input screen displayed on the display device 50, the decision section 33 decides that these passwords are not in agreement (step 603) and so does not output the ejection instruction of disk D. The loading roller 11b is therefore not operated, so the disk D cannot be taken out. If it is found in step 603 in FIG. 6 that the passwords are not in agreement, the processing of FIG. 6 may be arranged to be terminated at this point but is also possible for it to be arranged for a screen to be displayed requesting that the password be input again.

[3. Beneficial Effect of the Embodiment]

The benefits of the embodiment described above are as follows. Specifically, the disk D cannot be ejected without inputting the previously registered password, so the disk D cannot be taken out by persons other than the authorized user.

Furthermore, since for the drive mechanism section 10 a system is adopted wherein the disk D is fed by a loading roller 11b rather than a tray system, the construction is not one in which the disk D can be forcibly extracted on its own and since the frame 10a itself of the drive mechanism section 10 is accommodated in the computer main unit C in such a way that it cannot be pulled out, forcible removal of the disk D by a person other than the authorized user can be reliably prevented.

In this way, removal of the disk D by a person other than the authorized user can be prevented by software means and mechanical means, so theft of the disk D can be reliably prevented.

[4. Other Embodiments]

The present invention is not restricted to the above embodiment. Although, in the above embodiment, the case was described in which the user entered and registered a password capable of being chosen at will and thereafter, when ejection was desired, obtained authentication by inputting this password, it would be possible to arrange for authentication to be obtained by inputting information specific to the disk (for example the file name recorded therein, the holder name, or TOC (table of contents) information, playing time (which could be that of a specified track or the total playing time) or the disk title etc). In such cases, password registration processing by the user may be made unnecessary.

In such cases, a construction could be adopted wherein disk-specific information as described above is automatically read from the disk by default and stored and registered in a memory section and wherein the decision unit determines whether the disk-specific information that is input by the user matches or does not match. Also, a construction could be adopted whereby, on insertion of a disk, specific information selected by the user from a plurality of items of specific information displayed on the screen is stored and registered in the memory section and employed for authentication. By thus employing disk-specific information, the user can more easily remember the authentication information than by using a password and registration of the authentication information is facilitated.

Also, the input means for inputting the authentication information is not restricted to a keyboard or mouse. For example, when applying the present invention to a game device or audio/video device wherein a disk is employed as the recording medium, a construction could be adopted in which the authentication information is input from input means such as the buttons of a game pad, a joystick, the operating buttons of an escutcheon or a remote controller etc.

In such cases, it could be arranged to input a password by selecting letters, numerals or symbols etc from a table displayed on the screen but it would for example also be possible to arrange to employ a combination of the sequence or number of times of pressing a plurality of buttons as the authentication information. By adopting such an arrangement, setting and input of the authentication information by the operation of buttons can easily be performed.

Also, the password is not restricted to being a so-called code number but could be any of letters, symbols or numbers or a combination of these. Also, the type of authentication information is not restricted to passwords. For example, as the input means connected to the authentication control means, it would be possible for an identification device to be provided whereby the voice, fingerprint or retinal pattern is detected and converted to a signal suitable for comparison and the authorized user to be identified by using the signal from this identification device.

More specifically, if a voice identification device is connected to the I/F 35 in the above embodiment, authentication of a so-called specified speaker (speaker restriction) can be performed. First of all, when the voice of the authorized user is input from the voice identification device, the voice signal is stored in the memory section 32 by the registration and management section 31. Next, when there is a voice signal input through the voice identification device from the authorized user who inputted the disk ejection instruction, the decision section 33 compares the input voice signal with the voice signal of the authorized user stored in the memory 32 and, if these agree, outputs a disk ejection instruction from the ejection instruction section 34. If they do not agree, the disk ejection instruction is not output. The same applies when a fingerprint identification device or retinal pattern identification device is connected. It should be noted that, in the case of voice, identification accuracy can be increased by restricting the phrases that can be employed to an arbitrary phrase or a pre-set phrase.

In addition, the above various types of authentication information could be employed in combination. For example, by storing a password and a voice signal in the memory section, a construction could be adopted in which disk ejection processing is performed if both this password and the voice agree with the password that was input from the keyboard and the voice signal from the voice identification device. Also, a construction could be adopted in which disk ejection processing is performed if either of the registered password and voice agree with the input authentication information. Such a combination may comprise any of a password, button operation, voice, fingerprint, or retinal pattern or other types of authentication information.

Also, the theft prevention effect can be further raised by forming the frame 10*a* of the drive mechanism section 10 integrally with the computer main unit C. Also, the position of the insertion port 10*b* could be any position on the computer main unit C.

Also, the disk loading mechanism employing the loading roller is not restricted to that of the embodiment described above. For example, all well-known techniques such as that illustrated in Japanese Utility Model Publication Number H. 5-1003 or Japanese Patent Publication Number H. 6-103568 could be employed. Also, the type, position and number of sensors used to detect insertion/ejection etc of the disk can be freely designed and a construction aimed at preventing insertion of foreign bodies or identification of the disk diameter could be adopted by employing a plurality of sensors as in the technology illustrated in Japanese Patent Publication Number H. 6-103568.

Also, for the clamping mechanism, a construction could be adopted whereby the disk is pressed against a damper arranged in the ceiling of the drive mechanism by raising of the turntable side. A construction could be adopted wherein a link mechanism is provided whereby the disk release and pressing-on that are executed by the clamping mechanism and the disk pressing-on and release by the loading roller, performed by the roller approach/retraction mechanism, are conducted in a linked fashion.

Furthermore, the disk drive device to which the present invention is applied is not restricted to a device for a personal computer of the desktop or notebook type. For example, as described above, it could be employed as a drive device for recording media of games machines or a drive device for recording media of audio/video devices. Consequently, the display device also could be a television receiver or a display device using LEDs etc. Also, the recording media could be for recording/reproduction or solely for reproduction (signal read only). The device could be a device intended for recording media of any type or size, so long as it is a device for recording media capable of being fed by means of a loading roller.

INDUSTRIAL APPLICABILITY

As described above, with the present invention, a disk drive device can be provided wherein removal of the disk by persons other than the authorized user can be reliably prevented.

The invention claimed is:

1. A disk drive device comprising a signal detection section that detects a disk signal and a disk ejection mechanism that ejects a disk, characterized in that said disk drive device comprises:
    mechanism control means that controls the drive of said disk ejection mechanism and authentication control means that outputs a disk ejection instruction to said mechanism control means when a disk ejection instruction and authentication information are input,
    said authentication control means being connected with authentication information input means that inputs authentication information, and
    said authentication control means comprises:
    an authentication information storage section that stores prescribed authentication information;
    a decision section that determines whether or not the authentication information that is input from said authentication information input means agrees with the authentication information that is stored in said authentication information storage section; and
    a disk ejection instruction section that outputs a disk ejection instruction to said mechanism control means if a disk ejection instruction is input and said decision section determines that the authentication information is in agreement,
    said authentication information includes disk-specific information that is detected by said signal detection section on the disk and stored in said authentication information storage section, said disk-specific information is selected from one or more of the disk title, file name, holder name, table of contents information and playing time; and a display screen for displaying disk-specific information when a disk is inserted into the disk drive device and a user is enabled to select from the disk-specific information the authentication information to be stored by the authentication information input means.

2. The disk drive device according to claim 1, characterized in that said disk ejection mechanism comprises a loading roller that is arranged so as to be capable of feeding a disk by rotation and a motor constituting a drive power source of said loading roller.

3. The disk drive device according to claim 2, characterized in that said authentication information input means comprises a plurality of switches operated by a plurality of buttons; and said authentication information includes information relating to a combination of sequence and number of times of switch changeover in accordance with the operation of said plurality of buttons.

4. The disk drive device according to claim 2, characterized in that said authentication information input means includes a voice identification section, and said authentication information includes speaker-limiting voice information.

5. The disk drive device according to claim 2, characterized in that authentication information input means includes a fingerprint identification section, and said authentication information includes fingerprint information.

6. The disk drive device according to claim 2, characterized in that said authentication information input means includes a retinal pattern detection section, and said authentication information includes retinal pattern information.

7. The disk drive device according to claim 2, characterized in that the authentication information used in the determination by said decision section is at least two of a plurality of types of authentication information or is one or other of at least two types of the plurality of authentication information.

8. The disk drive device according to claim 1, characterized in that said authentication information includes a password.

9. The disk drive device according to claim 8, characterized in that the authentication information used in the determination by said decision section is at least two of a plurality of types of authentication information or is one or other of at least two types of the plurality of authentication information.

10. The disk drive device according to claim 1, characterized in that said authentication information input means includes a plurality of switches operated by a plurality of buttons; and said authentication information includes information relating to a combination of sequence and number of times of switch changeover in accordance with the operation of said plurality of buttons.

11. The disk drive device according to claim 10, characterized in that the authentication information used in the determination by said decision section is at least two of a plurality of types of authentication information or is one or other of at least two types of the plurality of authentication information.

12. The disk drive device according to claim 1, characterized in that said authentication information input means includes a voice identification section, and said authentication information includes speaker-limiting voice information.

13. The disk drive device according to claim 12, characterized in that the authentication information used in the determination by said decision section is at least two of a plurality of types of authentication information or is one or other of at least two types of the plurality of authentication information.

14. The disk drive device according to claim 1, characterized in that authentication information input means includes a fingerprint identification section, and said authentication information includes fingerprint information.

15. The disk drive device according to claim 14, characterized in that the authentication information used in the determination by said decision section is at least two of a plurality of types of authentication information or is one or other of at least two types of the plurality of authentication information.

16. The disk drive device according to claim 1, characterized in that said authentication information input means includes a retinal pattern detection section, and said authentication information includes retinal pattern information.

17. The disk drive device according to claim 16, characterized in that the authentication information used in the determination by said decision section is at least two of a plurality of types of authentication information or is one or other of at least two types of the plurality of authentication information.

18. The disk drive device according to claim 1, characterized in that the authentication information used in the determination by said decision section is at least two of a plurality of types of authentication information or is one or other of at least two types of the plurality of authentication information.

19. The disk drive device according to claim 18, characterized in that said authentication information includes a password.

20. The disk drive device of claim 1, wherein said authentication information is directly related to the data content stored on the disk that is also to be reproduced from the disk when read by the signal deletion section.

21. A disk drive device comprising a signal detection section that detects a disk signal and a disk ejection mechanism that ejects a disk, characterized in that said disk drive device comprises:

a loading roller in the disk ejection mechanism for contacting the disk to insert and remove the disk to and from the disk drive device;

a display screen displaying disk-specific information when the disk is inserted into the disk drive device;

an operator input section that enables an authentication control section to designate and enter authentication information selected by the operator from the disk-specific information unique to the disk displayed on the display screen;

a registration management section that manages the authentication information and stores the selected portion of the disk-specific information designated by the operator from the display screen as the authentication information in a memory when a password entry mode of operation is enabled;

mechanism control section that controls the drive of said disk ejection mechanism;

an authentication control section that outputs a disk ejection instruction to said mechanism control means when a disk ejection instruction and authentication information are input, said authentication control section being connected with the operator input section that inputs authentication information, and comprises:

a decision section that determines whether or not the authentication information that is input from said operator input section agrees with the authentication information that was stored in said memory during the password entry mode of operation; and a disk ejection instruction section that outputs a disk ejection instruction to said mechanism control section if a disk ejection instruction is input and said decision section determines that the inputted authentication information is in agreement with the stored authentication information in the memory.

22. A disk drive device comprising a signal detection section that detects a disk signal and a disk ejection mechanism that ejects a disk, characterized in that said disk drive device comprises:

a disk ejection mechanism for contacting the disk to insert and remove the disk to and from the disk drive device;

a display screen displaying disk-specific information when the disk is inserted into the disk drive device;

an operator input section that enables an authentication control section to designate and enter authentication information selected by the operator from the disk-specific information unique to the disk displayed on the display screen;

a registration management section that manages the authentication information and stores the selected portion of the disk-specific information designated by the operator from the display screen as the authentication information in a memory when a password entry mode of operation is enabled;

mechanism control section that controls the drive of said disk ejection mechanism;

an authentication control section that outputs a disk ejection instruction to said mechanism control means when a disk ejection instruction and authentication information are input, said authentication control section being connected with the operator input section that inputs authentication information, and comprises:

a decision section that determines whether or not the authentication information that is input from said operator input section agrees with the authentication information that was stored in said memory during the password entry mode of operation; and a disk ejection instruction section that outputs a disk ejection instruction to said mechanism control section if a disk ejection instruction is input and said decision section determines that the inputted authentication information is in agreement with the stored authentication information in the memory.

* * * * *